US011023554B1

(12) United States Patent
Miller et al.

(10) Patent No.: US 11,023,554 B1
(45) Date of Patent: Jun. 1, 2021

(54) GENERATING CONTEXTS BASED ON INTENT DESCRIPTION OF CONTENT PROVIDER

(71) Applicant: Amazon Technologies, Inc., Seattle, WA (US)

(72) Inventors: John Martin Miller, Seattle, WA (US); Anuj Chadha, Seattle, WA (US); Anthony Crider, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 16/128,073

(22) Filed: Sep. 11, 2018

(51) Int. Cl.
| G06F 16/00 | (2019.01) |
| G06F 16/957 | (2019.01) |
| G06F 3/0482 | (2013.01) |
| G06F 9/451 | (2018.01) |
| G06F 16/955 | (2019.01) |
| G06F 16/958 | (2019.01) |
| G06F 16/9535 | (2019.01) |
| G06F 40/279 | (2020.01) |

(52) U.S. Cl.
CPC ........ *G06F 16/9574* (2019.01); *G06F 3/0482* (2013.01); *G06F 9/451* (2018.02); *G06F 16/955* (2019.01); *G06F 16/9535* (2019.01); *G06F 16/986* (2019.01); *G06F 40/279* (2020.01)

(58) Field of Classification Search
None
See application file for complete search history.

(56) References Cited

U.S. PATENT DOCUMENTS

| 8,271,878 B2 | 9/2012 | Kane et al. |
| 8,554,601 B1 | 10/2013 | Marsh et al. |
| 8,799,455 B1 | 8/2014 | Vora et al. |
| 9,037,975 B1 | 5/2015 | Taylor et al. |
| 2006/0242013 A1* | 10/2006 | Agarwal ........... G06Q 30/0263 705/14.49 |
| 2011/0022461 A1 | 1/2011 | Simeonov |
| 2018/0349981 A1 | 12/2018 | Grandhi |

OTHER PUBLICATIONS

U.S. Appl. No. 16/128,142, U.S. Patent Application, "Providing Content Based on Contextual Information," filed Sep. 11, 2018.

* cited by examiner

*Primary Examiner* — Meredith A Long
(74) *Attorney, Agent, or Firm* — Kilpatrick Townsend & Stockton LLP

(57) ABSTRACT

Techniques for improving dynamic content retrieval are described. In an example, a computer system may receive, from a content provider device, an intent description associated with providing content at a network resource. The computer system may determine a goal and a predicate based on the intent description and may select a workflow from a plurality of workflows based on the goal and the predicate. The workflow may be associated with determining a context of a network document based on historical behavior data of visitors to the network resource and on a taxonomy of the network resource. The computer system may determine the context based on an execution of the workflow, the historical behavior data, and the taxonomy. The computer system may store an association between the context and the content. The association may be usable to select the content for presentation in a network document of the network resource.

20 Claims, 8 Drawing Sheets

GENERATING CONTEXTS BASED ON INTENT DESCRIPTION OF CONTENT PROVIDER

BACKGROUND

Users operate computing devices to access different types of network documents from network resources, such as web pages from web sites. Typically, the network access of a computing device is supported by a dynamic content retrieval. In particular, content can be dynamically selected and retrieved from a content source and inserted in a network document provided to the computing device. In this way, relevant content can be presented at the computing device, thereby generally improving the dynamic content retrieval and network resource utilization (e.g., by providing relevant content instead of random content).

BRIEF DESCRIPTION OF THE DRAWINGS

Various embodiments in accordance with the present disclosure will be described with reference to the drawings, in which.

DETAILED DESCRIPTION

Figure 1:
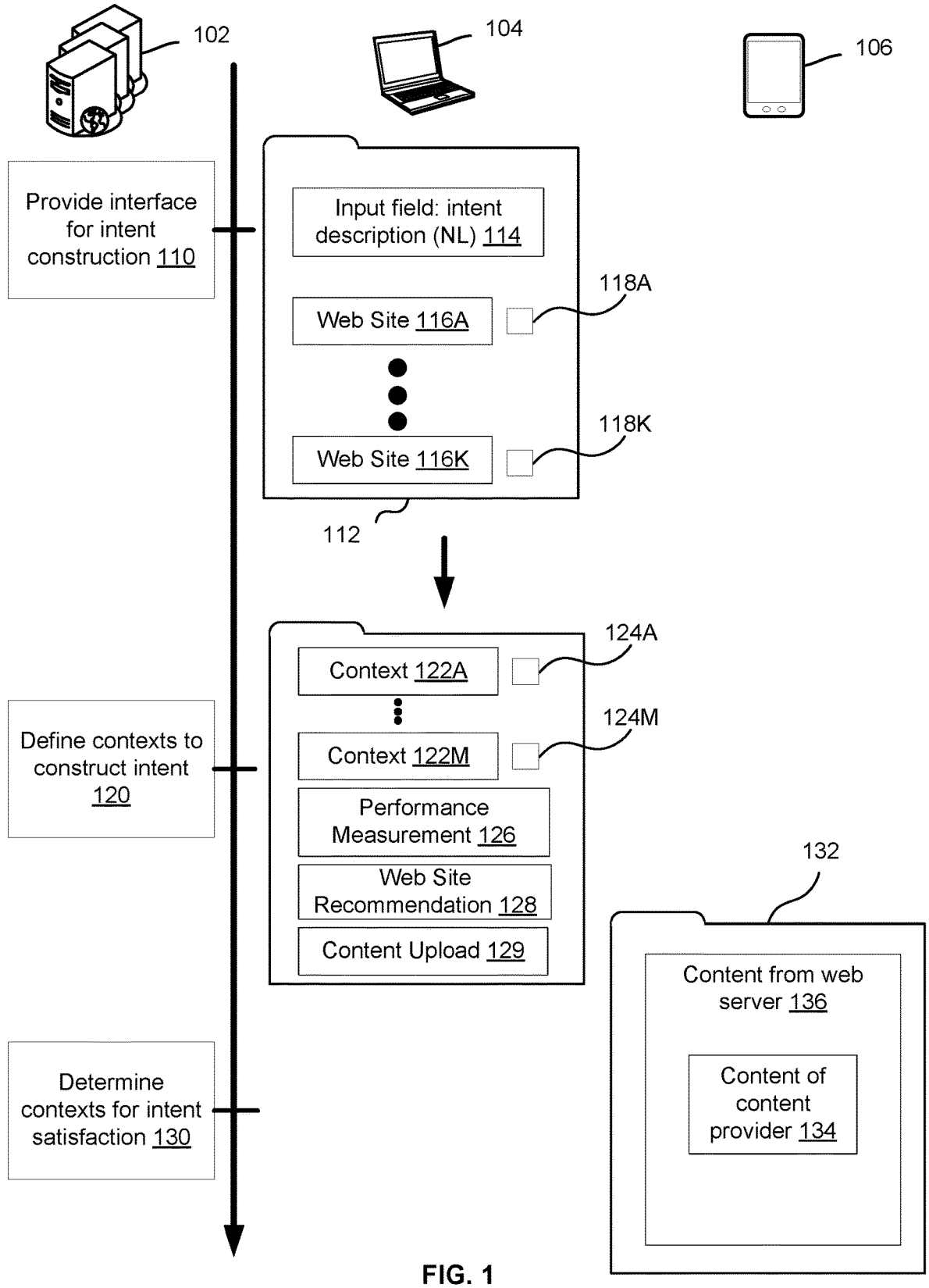
FIG. 1 illustrates an example of intent construction and intent satisfaction associated with providing content, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving the dynamic content retrieval and network resource utilization. In particular, contextual content targeting may be implemented, where contexts may be defined based on an intent of a content provider and the content selection may be performed based on such contexts. The context definition and the content selection may be referred to herein as intent construction and intent satisfaction, respectively.

In an example, to generate contexts under the intent construction, a computer system of a service provider may receive an intent description from a computing device of a content provider. The intent description may indicate a goal and predicates (e.g., constraints) for using content of the content provider. Based on the goal and predicates, the computer system may select and execute a workflow to identify applicable contexts from historical behavior data of visitors to network resources where the content could be presented and based on ontologies and taxonomies of such resources. Once identified, the computer system may associate the contexts with the content of the content provider, where such contexts can be subsequently used to select the content under the intent satisfaction.

Under the intent satisfaction, the computer system may receive a content request from a network system for content to be inserted in a network document requested by a computing device of a user. The computer system may augment the content request by adding contexts associated with network document, the computing device, and the user. Some or all these contexts may be pre-computed under the intent construction. The computer system may match the contexts to contexts associated with candidate content of different content providers. To select one of the candidate content, the computer system may score each of the candidate content based on the matched contexts, the historical behavior data, and the intent description of the corresponding content provider. The scores may be used, among other factors, to select the content that is then inserted in the network document.

To illustrate, consider an example use case of advertisement targeting on web pages. A service provider may administer multiple web sites. A first web site may offer items for sale, while a second web site may offer a video streaming service. An advertiser may be interested in showing an advertisement for their product line of basketball shoes on both web sites. Accordingly, the advertiser may operate a computing device to access an interface to an advertisement service of the service provider. At the interface, the advertiser may input their intent to "show my basketball shoes where I am likely to get purchases." Under the intent construction, the advertisement service may determine that the advertiser's goal includes user conversion and that a predicate includes basketball shoes. The advertisement service may then execute a workflow, such as a machine learning (ML) algorithm, that processes historical behavior data of web visitors to the two web sites to identify contexts that resulted in user conversions when exposed to advertisements related to shoes and/or basketball. The contexts may depend on the ontology and taxonomy of each web site. For example, basketball shoes may have a different meaning under each web site (e.g., an item available for sale under the first web site and a video about a sport event under the second web site) and may correspond to different categories (e.g., a shoe category under the first web site and a video genre under the second web site). Hence, the contexts may include different keywords from visited web pages of the web sites and/or attributes of keywords (e.g., "basketball shoes", "sports shoes", "athletic wear", "comfortable shoes", "Brand 'ABC' shoes", "Brand 'XYZ' shoes", and other contexts for the first web site, and "basketball game", "sport event", "basketball player 'John Doe' documentary", and other contexts for the second web site). The advertisement service may store associations between such contexts and the advertisement about the advertiser's basketball shoes.

Upon a web visitor to either web sites, the advertisement service may receive an advertisement request identifying, for example, the visitor's requested web page (e.g., a particular item detail page from the first web site or a particular movie page from the second web site). The advertisement service may retrieve pre-computed contexts associated with the requested web page and may on-the-fly compute visitor contexts (e.g., visitor's location and/or user segment to which the visitor belongs). Such context may be added to the advertisement request, thereby augmenting the request to include request contexts. Further, the advertisement service may match the request contexts with pre-computed contexts that are associated with the advertiser's advertisement about basketball shoes and with other advertisements. Accordingly, various candidate advertisements may be identified as being relevant for insertion in the requested web page. The advertisement service may use a ML algorithm to score these advertisements, where each is scored by inputting the contexts and the corresponding intent description to the ML algorithm. The scores may be used among other factors (e.g., placement rate, advertisement campaign budget, advertisement bid amount, visitor fatigue, and the like) to select the basketball shoes advertisement. This advertisement may then be inserted in the requested web page when presented to the web visitor.

Embodiments of the present disclosure provide many technical advantages over existing dynamic content retrieval systems, as further described in connection with the next figures. For example, the interface to a dynamic content retrieval system may be significantly improved, where it may be sufficient to a content provider to define their intent using natural language. Further, given an extensive knowledge set about behavior data, the intent may be translated into a set of contexts by using, for instance, artificial intelligence (AI). Accordingly, the contexts may more accurately define contextual signals that otherwise, would not have been defined by the advertiser. Such contexts can be monitored and used to select and retrieve more relevant content for insertion, thereby improving the performance of the content retrieval system. In turn, because more relevant content is selected, the utilization of the underlying computing resources may be optimized, whereby these resources may no longer need to process unrelated or random content.

In the interest of clarity of explanation, various embodiments are described herein in connection with selecting and inserting content in a web page. However, the embodiments are not limited as such and apply to any other type of network documents of a network resource. For example, a computing device of a user may request access to a network document via an application programming interface (API) specific to the network resource. This access request may trigger a content request that may then be augmented with contexts. These contexts may then be used to select particular content that may be inserted and presented in the network document.

In embodiments, depending on the type of user information obtained and/or analyzed, appropriate measures are taken to ensure protection of the collected data, to empower the users to determine what data can be used for the purposes corresponding to the intent construction and intent satisfaction, as well as empower the users to indicate which portions of the collected data or user information should be deleted and/or no longer obtained by the service provider computers implementing the intent construction and intent satisfaction described herein.

FIG. 1 illustrates an example of intent construction and intent satisfaction associated with providing content, according to an embodiment of the present disclosure. As illustrated a service provider may operate a computer system 102 to receive an intent description from a computing device 104 of a content provider (referred to herein as content provider device for brevity). The computer system 102 may translate the intent description into a set of contexts and may associate this set with content of the content provider. A web visitor may operate a computing device 106 (referred to herein as visitor device for brevity) to access a web page of a web site. The computer system 102 may then use the contexts to insert the content of the content provider into the web page presented at the visitor device 106.

In an example, the computer system 102 may host a context-content service that provides 110 an interface to the content provider device 104. Generally, the interface may include a web interface or an API that allows the content provider to define an intent for using their content. The interface may provide additional functionality such as, informing the content provider about a potential performance of the content given the intent, allowing a selection of identified contexts, and/or allowing a selection of specific web sites for which the content would be available.

The interface may support one or more interaction modalities, such as an audible modality (e.g., where the content provider may interact with the advertisement service by uttering words to a voice-based device), a graphical modality (e.g., where the content provider may interact with the advertisement service via a graphical user interface (GUI) 112, and/or a combination of audible and graphical modalities. As illustrated in FIG. 1, the interface may provide a GUI 112 that is presented at the content provider device 104. The GUI 112 may include multiple fields corresponding to the supported functionalities including, for instance, an input field 114, web site fields 116A-116K (generally referred to herein as a web site field), and web site selection fields 118A-118K (generally referred to herein as a web site selection field). The input field 114 may receive an intent description of the content provider. This intent description may be entered as a natural language (NL) input at the input field 114. Generally, the intent description may define a goal of the content provider associated with presenting the content and a set of predicates, such as constraints and/or clauses that depend on a web site's taxonomy, for the presentation. The web site field may identify a web site by, for instance, presenting a domain name or a universal record locator (URL) of the web site. The web site selection field may allow a selection by the content provider of a corresponding web site. Once a web site is selected, the context-content service may generate contexts for that web site based on the web site's ontology and taxonomy, among other factors. Of course other arrangements of the GUI's 112 fields may be possible. For instance, rather than presenting a web site field and a web site selection field, the GUI 112 may include another input field for receiving an identifier of the web site. Alternatively, the input field 114 may also be used to input the identifier, along with the intent description.

Upon receiving the intent description and, as applicable, the selection of web site(s) via the interface, the computer system 102 may define 120 contexts to construct the intent of the content provider. In an example, the context-content service of the computer system 102 may determine the goal and predicate(s) from the intent description and may select a workflow. The workflow may include an executable analysis process that evaluates, based on historical behavior data, web pages and traits of visitors and visitor devices to generate contexts. The historical behavior data may include visitor journeys through the selected web site(s) (e.g., visited web pages), visitor interactions and results (e.g., clickstreams and conversions), visitor traits (e.g., user segments), and visitor device traits (e.g., locations, device types, browser types, operating system types, etc.). Each of the contexts may represent contextual information determined for a particular intent description from historical behavior data and applicable to a web site's ontology and taxonomy. For instance, a context associated with a web page may include a keyword found in the body of the web page (e.g., an identifier of a particular item in an item detail page, such as "shoes of brand 'ABC'") or an attribute of a plurality of keywords (e.g., an item category for different items or a value of a property of an item, such as "sports shoes" or "red shoes"). Generally, the attribute may correspond to a category defined based on the taxonomy of the web site or to a property value available given the taxonomy. Similarly, a context associated with a visitor may identify a visitor trait, whereas a context associated with a visitor device may identify a visitor device trait.

In addition, the context-content service may measure a performance associated with using the contexts to select and insert the content. This performance may represent a performance measurement of the content provider's intent. Various performance measurement types may be possible, including an uncontended performance measurement (e.g., the total audience size that can be exposed to the content, without other competing content) and a contended performance measurement (e.g., the percentage of the total audience size when other competing content are considered). Further, the context-content service may derive similar performance measures for web sites that were not selected by the content provider by deriving the related contexts. Depending on the performance (e.g., if the performance of an unselected web site is better than that of a selected web site), a recommendation may be made for selecting such a web site.

The interface of the context-content service may support these and other functionalities by providing the relevant data to and facilitating interactions of the content provider. For example and as illustrated, the GUI 112 may be refreshed to present many fields including context fields 122A-122M (generally referred to herein as a context field), context selection fields 124A-124M (generally referred to herein as a context selection field), a performance measurement field 126, a web site recommendation field 128, and a content upload field 129. A context field may identify a context derived from the execution of the workflow. A context selection field may allow a selection of the corresponding context field by the content provider, where upon the selection, the context-content service would associate the context with the content of the content provider. These two types of fields may be optional and need not presented to the content provider. In this way, the content provider may only need to define their intent without having to select contexts. The performance measurement field 126 may present the performance measurement for the intent. The web site recommendation field 128 may present a recommendation to select one or more web site(s) that were not selected by the content provider. The content upload field 129 may present an option for the content provider to accept the intent description and resulting contexts (selected, as applicable) and upload the content with which the intent description and contexts should be associated. The content upload may include receiving, by the computer system 102, the actual content from the relevant content source or receiving a network address location (e.g., a URL) where this content may be stored.

Upon the content upload, the computer system 102 may generate and store associations between the contexts and the content. The associations may be used to support contextual content targeting, including vertical searched by content servers. As illustrated, the computer system 102 may determine 130 contexts for intent satisfaction upon the visitor device's 106 access to a web page 132. For example, the context-content service may augment a content request with contexts associated with the web page 132, the visitor, and the visitor device 106. These contexts are then matched with context-content associations to identify a set of candidate content. The context-content may generate a relevancy score for each candidate content in the set given the contexts and the corresponding intent description. The scores may be used among other factors to select particular content 134 from the set. Hence, upon presentation at the visitor device 106, the web page 132 may include content 136 from the web server hosting the web page 132 (e.g., this content may be the body of the web page), and the particular content 134 of the content provider.

To illustrate, consider the example use case of advertisement targeting on web pages of a web site that offers items for sale. The web site may be hosted on the computer system 102. An advertiser may operate the content provider device 104 to access the GUI 112 and may input an intent description of "show my basketball shoes to as many users that visit web pages offering shoes for less than a $100." The computer system 102 may then derive different contexts from that intent description and may surface a resulting performance measurement on the GUI 112. Given this measurement, the advertiser may decide to refine their intent description by inputting "show my basketball shoes on any web page where I am likely to get purchases" at the GUI 112. One of these contexts may be "biography book of player 'John Doe'." The computer system 102 may derive again contexts applicable to this intent and refresh the GUI 112. Satisfied with the expected performance, the advertiser may upload their advertisement about their basketball shoes. The computer system 102 may store associations between the contexts of the refined intent description and the advertisements. Upon a visitor access to a detail page of the web site offering the biography book of player 'John Doe', the computer system 102 may match this context with the context associated with the advertisement and may score the advertisement. Given a comparison of the score with those of other candidate advertisements, the computer system 102 may select and insert the basketball shoes advertisement in the detail page about the biography book of player 'John Doe'.

In various examples, the computer system 102 hosting the context-content service may also host the selectable web site(s). In this way, behavior data may be collected by the computer system 102 and used for the intent construction. However, the embodiments may not be limited as such. For example, the embodiments similarly apply to a computer environment, where the computer system 102 may host the context-content service but not a web server that hosts a selectable web site. In this case, a collection server of the computer system 102 may receive web referrals and redirections from the web server to then derive the behavior data or may import the behavior data from a third party. In both cases, the computer system 102 may similarly use the behavior data to derive the contexts.

By using the GUI 112 as illustrated in FIG. 1 (or by relying on the functionalities of the described interface), many technical advantages over existing content retrieval system (including content targeting systems) may become possible. For instance, and referring to the advertisement use case, a typical contextual targeting advertisement system necessitates the advertiser to identify relevant web pages on each site where their advertisement could be shown. More specifically, the advertiser may need to understand the ontology of each web site, and identify the relevant keywords where their advertisement is to be shown. However, it is burdensome for the advertiser to identify the most relevant keywords across different web sites and keep them up to date. This is problematic for many reasons. For instance, advertising on different web sites may need advertisers to understand different ontologies and taxonomies. Even if the advertiser is able to ingest and understand such ontologies and taxonomies, the advertiser may still need to identify the keywords that are relevant to their product. Depending on the number of keywords and how the advertiser defines relevancy, this can be a daunting challenge. Further, different advertisers have different intents that are satisfied by different keyword sets. In particular, an advertiser whose intent is to increase their conversion rate is looking to show their product on contextually similar pages that are likely to drive sales. In comparison, an advertiser whose intent is reach or product awareness, their intent may be satisfied with a broader range of products that are relevant to the advertiser's brand regardless of direct sales numbers. The number of advertiser intents increases with the number of possible website ontologies and taxonomies, making a further challenge to identify the keywords that satisfy any given advertiser intent. In addition, for some advertiser intents, the set of relevant keywords may change over time. In order to keep this set fresh, an advertiser should constantly scan for new keywords and revisit previously selected keywords to see if they are still relevant. In contrast, embodiments herein when implemented for advertisement targeting may provide a contextual targeting solution that accepts intents from advertisers for different ontologies and taxonomies and automatically satisfies those intents with relevant contexts, including keywords and other contextual information. This may shift the burden of understanding different advertising domains and identifying relevant contexts from the individual advertisers to the service provider's computer system 102. An advertiser may need to simply input their intent at the GUI 112. By relying on an extensive body of knowledge about behavior data, the computer system 102 may derive the most relevant contexts to use for the advertisements.

Figure 2:
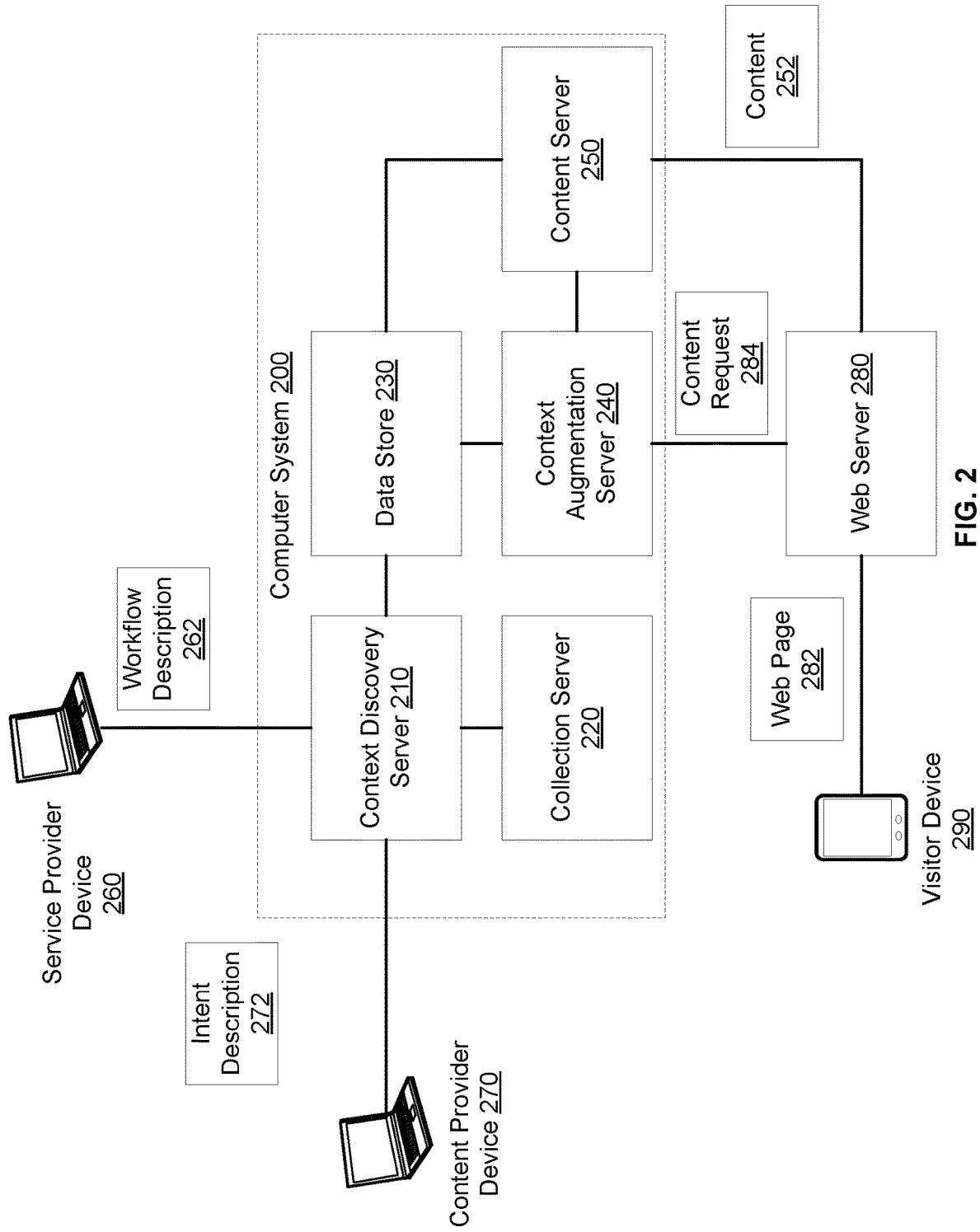
FIG. 2 illustrates an example of a network environment for generating contexts based on an intent description and providing content based on the contexts, according to an embodiment of the present disclosure.

FIG. 2 illustrates an example of a network environment for generating contexts based on an intent description and providing content based on the contexts, according to an embodiment of the present disclosure. As illustrated, the network environment may include a computer system 200, a service provider device 260, a content provider device 270, a web server 280, and a visitor device 290. The computer system 200 may be similar to the computer system 102 of FIG. 1 and may host a context-content service by distributing the functionalities of such service across the different servers. A service provider may operate the service provider device 260 to manage some or all of the functionalities of the computer system 200. For example, the service provider may define various workflows that the computer system 200 may use to derive contexts. A content provider may operate the content provider device 270 to define their intent and upload content. The computer system 200 may select one of the workflows to then derive and store contexts for the content provider's intent. A visitor may operate the visitor device 290 to request a web page 282 from the web server 280. The web server 280 may, but need not be, part of the computer system 200. The web server 280 may send a content request 284 to the computer system 200, where the content request 284 may trigger a selection of the content provider's content 252 based on contexts. The content 252 may then be inserted in the web page 282 and presented at the visitor device 290.

As illustrated, the computer system 200 may include a plurality of computing resources. Each of such resources may represent computing hardware or a computing service implemented on computing hardware. The computer resources may include a context discovery server 210, a collection server 220, a data store 230, a context augmentation server 240, and a content server 250. Interactions between these computing resources are further illustrated in the next figure.

In an example, the context discovery server 210 may provide an interface to the service provider device 260 (referred to herein as an administrator interface) and an interface to the content provider device 270 (referred to herein as an intent interface). The service provider may input a workflow description 262 at the administrator interface. This workflow description 262 may include definitions of a workflow (e.g., process steps), type of behavior data that should be analyzed (e.g., user conversion data, user exposure data, etc.), type of analysis (e.g., statistical analysis, ML algorithm, data type, data sources, input types, output types, etc.), and criteria for selecting the workflow (e.g., goals and/or predicates that can be matched to the intent description, specificity level that can be matched to a specificity of the intent description, etc.). The context discovery server 210 may accordingly generate and store the workflow in the data store 230, along with the criteria (e.g., such as in metadata of the workflow or as a file).

The content provider may input an intent description 272 at the intent interface and use other functionalities of this interface, as described herein above in connection with the GUI 112 of FIG. 1. The context discovery server 210 may accordingly derive and store the contexts in the data store 230. To do so, the context discovery server 210 may rely on the workflows stored in the data store 230 and on behavior data collected by the collection server 220.

The data store 230 may also store associations between the contexts derived by the context discovery server 210 and content of content providers. Further, the data store 230 may store various pre-computed contexts for different web pages 282 and web sites, where these contexts may be derived by using one or more workflows.

The context augmentation server 240 may receive the content request 284 from the web server 280. In response, the context augmentation server 240 may query the data store 230 to identify relevant pre-computed contexts and may augment the content request by adding such contexts thereto.

The content server 250 may receive the augmented content request and may use its cache or query the data store for matches between the contexts included in the augmented content request 284 and the contexts associated with the content of the content providers. Content that have matching contexts may be selected and added to a set of candidate content. The content server 250 may then score each candidate content and select particular content from the set based on the scores. The particular content may be provided as the content 252 to the web server 280.

Figure 3:
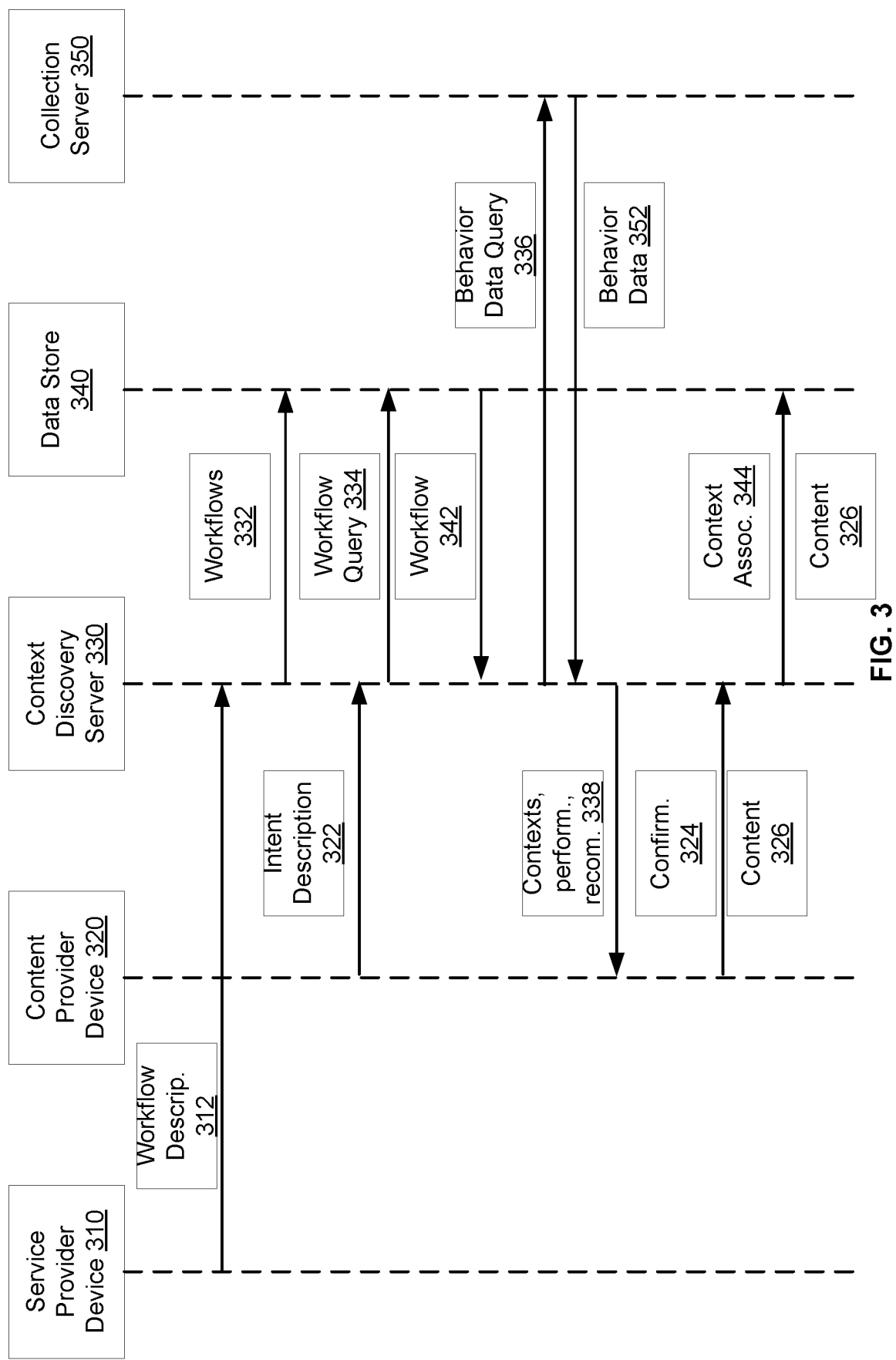
FIG. 3 illustrates an example of interactions between computing resources for generating contexts based on an intent description, according to an embodiment of the present disclosure.

FIG. 3 illustrates an example of interactions between computing resources for generating contexts based on an intent description, according to an embodiment of the present disclosure. In an example, the interactions may include calls, such as API calls to exchange data, execute processes, and generate contexts. Some or all of the computing resources may be managed by a service provider and may be the same as those described herein above in connection with FIG. 2. In particular, the computing resources may include a context discovery server 330, a data store 340, and a collection server 350.

As illustrated, a service provider device 310 of the service provider may send a workflow descriptions 312 to the context discovery server 330. For example, the service provider may input definitions and selection criteria of different workflows at an administrator interface presented at the service provider device 310. The context discovery server 330 may receive this information and, in response, may generate and transmit workflows 332 and the selection criteria to the data store 340 for storage thereat.

A content provider may operate a content provider device 320 and access, via an intent interface, the context discovery server 330. The access may include sending an intent description 322 to the context discovery server 330 via the intent interface. In response, the context discovery server 330 may generate and send a workflow query 334 to the data store 340. This workflow query 334 may include different types of information. In an example, the context discovery server 330 may derive goal(s) and predicate(s) from the intent description 322 and may send this information in the workflow query 334. In another example, the context discovery server 330 may derive a specificity level of the intent description 322 from the goal(s) and predicate(s) and may include the specificity level in the workflow query 334. In yet another example, the context discovery server 330 may send the intent description 322 or the goal(s) and predicate(s) in the workflow query 334 and a query engine of the data store 340 may derive the goal(s) and predicate(s) from the intent description 322 or the specificity level from the goal(s) and predicate(s). In these various examples, the data store 340 may return a workflow 342 to the context discovery server 330 based on the information received in the workflow query 334. Generally, the query engine of the data store 340 may select the workflow 342 from the stored workflows 332 based on the selection criteria by, for instance, matching goals and predicates and/or matching specificity levels. Returning the workflow 342 may include sending an identifier of the workflow 342 to the context discovery server 330.

The context discovery server 330 may identify, from the workflow 342 and the intent description 322, a particular type of behavior data that should be analyzed (e.g., user conversion data, user exposure data, data collected for a particular web site(s), etc.) and may send a behavior data query 336 to the collection server 350. The behavior data query 336 may identify the particular type of the behavior data. In response, the collection server 350 may return the applicable behavior data 352 to the context discovery server 330. Alternatively or additionally, the behavior data may also be stored at the data store rather than the collection server 350. In such a case, the behavior data query 336 can be sent to the data store 340 instead.

Next, the context discovery server 330 may execute the workflow 342 and analyze the behavior data 352 accordingly. For instance, if the workflow 342 invokes a particular ML algorithm, the context discovery server 330 may input the behavior data 352 (or any feature map that the context discovery server 330 may generate from this behavior data 352) to the ML algorithm. The output 338 of the execution of the workflow 342 may include contexts and, optionally, performance measurements and recommendations. The context discovery server 330 may transmit the output 338 to content provider device 320 for presentation at the intent interface.

The content provider may operate the content provider device 320 to send a confirmation 324 and content 326 to the context discovery server 330. The confirmation 324 may indicate that the content provider would like to use the contexts (or a subset thereof that may be selected via the intent interface) for subsequent selection and insertion of the content 326 in web pages. Of course, if any changes to the intent description 322 are made, the context discovery server 330 may re-generate the contexts and provide an update to the output 338. Sending the content 326 from the content provider device 320 to the context discover server 330 may include transmitting the content or an identifier thereof, such as an address of a network location (e.g., URL) where the content may be stored.

The context discovery server 330 may generate context associations 344 based on the confirmation 324 and the content 326. Further, the context discovery server 330 may transmit the context associations 344 and the content 326 to the data store 340 for storage thereat. Generally, a context association 344 may include an association between a context from the output 338 and the content 326. Various types of the content associations may be possible. One example type may associate the context with the content 326 and another example type may have the reverse association (e.g., of the content 326 with the context). These two types can be used for different purposes. For instance, the context association 344 may include a first key-value pair, where the key and the value of this pair include the context and the identifier of the content 326, respectively. The context association 344 may also include a second key-value pair, where the key and the value of this pair include the identifier of the content 326 and context, respectively. The first pair may be used to match the context (e.g., the key) with a detected context associated with a visitor device access to a web page and, accordingly identify the content 326. The second pair may be used to return query results about content to the content provider device 320. In particular, the content provider may submit a query about the contexts associated with one of its particular content. The content in the second key-value pair may be matched to the particular content to then return a result about the context. In this way, the content provider may quickly identify the associated contexts and/or the total number thereof.

Figure 4:
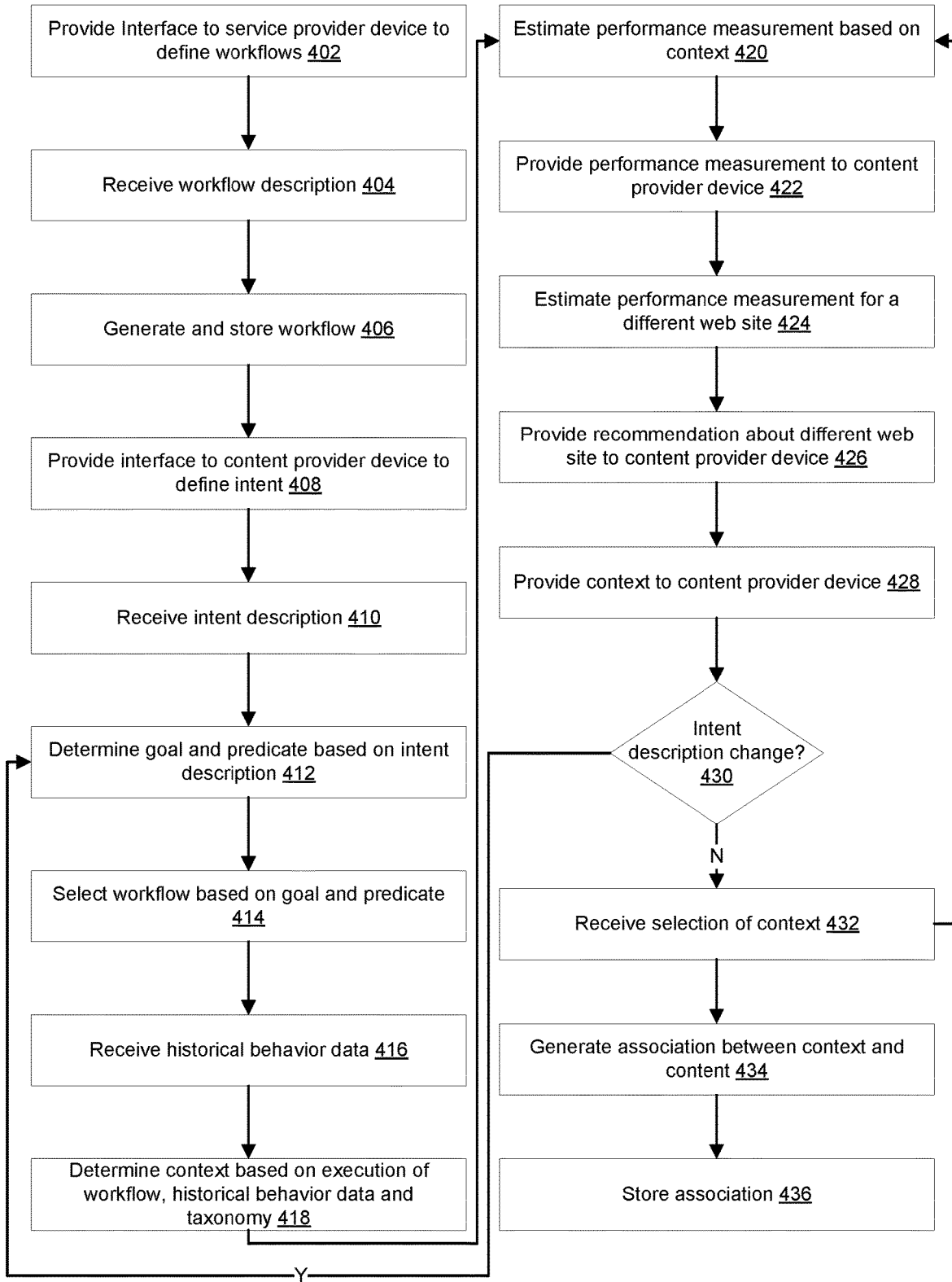
FIG. 4 illustrates an example flow for generating contexts based on an intent description, according to an embodiment of the present disclosure.

FIG. 4 illustrates an example flow for generating contexts based on an intent description, according to an embodiment of the present disclosure. Instructions for performing the operations of the flow can be stored as computer-readable instructions on a non-transitory computer-readable medium of a computer system, such as the computer systems described herein above in connection with FIGS. 1-3. As stored, the instructions represent programmable modules that include code or data executable by a processor(s) of the computer system. The execution of such instructions configures the computer system to perform the specific operations shown in the figures and described herein. Each programmable module in combination with the processor(s) represents a means for performing a respective operation(s). While the operations are illustrated in a particular order, it should be understood that no particular order is necessary and that one or more operations may be omitted, skipped, and/or reordered. In the interest of clarity of explanation, the flow is illustrated in connection with generating a context associated with a web page of a web site. The flow similarly applies to generating multiple contexts associated with a same web page, different web pages, same web site, and/or different web sites.

As illustrated, the example flow may start at operation 402, where the computer system may provide an interface (e.g., an administrator interface) to a service provider device to define workflows. In an example, the interface may include a GUI that is presented at the service provider device. The computer system may drive the GUI.

At operation 404, the computer system may receive a workflow description from the service provider device based on the interface. In an example, a service provider may input process definitions, analysis type, behavior data type, and selection criteria in different fields of the GUI. The inputted information may be transmitted from the service provider device to the computer system.

At operation 406, the computer system may generate and store a workflow based on the workflow description. In an example, the computer system may generate a set of executable instructions that define the process steps, the applicable analysis type and behavior data type that should be analyzed under each step, network addresses of the relevant processes and relevant behavior data, and metadata for the selection criteria. The generated workflow may be stored in a data store accessible to the computer system.

At operation 408, the computer system may provide an interface (e.g., an intent interface) to a content provider device to define intent. In an example, the interface may include a GUI that is presented at the content provider device, similar to the GUI 112 of FIG. 1. The computer system may drive the GUI.

At operation 410, the computer system may receive an intent description from the content provider device based on the interface. In an example, a content provider may input, in one or more input fields of the GUI, a description of an intent for presenting content at the web site. This intent description may follow a natural language format. The inputted intent description may be transmitted from the content provider device to the computer system.

At operation 412, the computer system may determine a goal(s) and a predicate(s) based on the intent description. In an example, the goal(s) and predicate(s) are determined by using query understanding to identify a query structure and natural language processing to identify the goal(s) and predicate(s) given the structure. Further, the predicate(s) may represent a constraint or a query clause that depends on the ontology and taxonomy of the web site associated with the intent description. In this case, the natural language processing may also account for such ontologies and taxonomies.

At operation 414, the computer system may select a workflow from a plurality of workflows based on a number of factors. In an example, the different workflows may be available from the data store. The factors may include the intent description, the goal(s) and predicate(s), and the specificity level. The computer system may match one or more of these factors with the selection criteria of a workflow to select the workflow. In an illustration, the selection criteria may include an intent description. In this illustration, the computer system may match the intent description received at operation 410 with the selection criteria and select the workflow. In another illustration, the selection criteria may include a set of goals and a set of predicates. In this illustration, the computer system match the goal(s) and predicate(s) determined at operation 412 with the selection criteria to select the workflow. In yet another illustration, the selection criteria may include a query specificity level. Accordingly, the computer system may derive a specificity level of the intent description based on the goal(s) and predicate(s) and may match this specificity level with the selection criteria. Different techniques for determining match may be possible. In an example, an AI model, such as a ML algorithm, may be trained to perform the match. Once trained, the input to the AI model may include one or more of the factors, and the output may identify the workflow.

In an example, the AI model is used for selecting the workflow based on the intent description (or any of the other factors). In particular, the intent description (or the other factors) may be an input to the AI model. The AI model may be trained to determine candidate web pages of the web site based on the intent description (or the other factors) and to identify candidate keywords from the candidate web pages. Each of such keywords may correspond to, for an instance, an item that a web page may describe (e.g., the item of an item detail page). The AI model may also be trained to compute a similarity measurement between the candidate keywords. This measurement may indicate how similar or dissimilar the candidate keywords (or the items) may be. One type of a similarity measurement may relate to attributes of the candidate keywords. If the candidate keywords share a common set of attributes (e.g., these keywords have similar attributes), the similarity measurement may indicate that a similarity exists between the attributes. In this case, the selected workflow may include a keyword identification workflow. Specifically, the keyword identification workflow may be defined and executed to, for instance, identify keywords. Otherwise, the similarity measurement may indicate that a dissimilarity exists between the attributes. In this case, the selected workflow may include an attribute identification workflow. Specifically, the attribute identification workflow may be defined and executed to, for instance, identify attribute(s) of one or more keywords.

To illustrate, and referring to detail pages describing items, the candidate keywords may be identifiers of the items (e.g., specific product numbers). These items may belong to a number of item categories (e.g., "running shoes," "sportswear," "biography books," etc. or other categories as defined based on the web site's taxonomy) and the attributes may correspond to the item categories. If the number of the item categories is small, the similarity measurements may indicate the similarity and, accordingly, the attribute identification workflow is selected. However, if the number of the item categories is large or if the item categories are unrelated to each other (e.g., not being sub-categories of a same category, depending on the web site's taxonomy), the similarity measurements may indicate the dissimilarity and, accordingly, the keyword identification workflow is selected.

Different techniques for deriving the specificity level may be possible. In an example, the specificity level may depend on the number of predicates. Generally, the larger the number of the predicates, the more specific the intent description (e.g., the higher the specificity level) may be. In another example, the computer system may determine a number of expected contexts (e.g., expected keywords) based on the goal(s) and predicate(s). This number may represent the potential size of the set of contexts that may be subsequently derived. The size of this set may be estimated by inputting the goal(s) and predicate(s) to a prediction model (e.g., a ML algorithm) trained based on historical intent descriptions. If the number is smaller than a threshold indicating that the set size may be small, the computer system may determine that the intent description has a high specificity level. On the other hand, if the number is larger than a threshold indicating that the set size may be too large, the computer system may determine that the intent description has a low specificity level. High and low specificity levels may be matched to different workflows. In particular, for a high specificity level intent description, the selected workflow may include the keyword identification workflow. In comparison, for a low specificity level intent description, the selected workflow may include the attribute identification workflow.

At operation 416, the computer system may receive historical behavior data. In an example, the computer system may determine the type of the historical behavior data based on the workflow and may retrieve the applicable behavior data from the data store or a collection server. The historical behavior data may include data about visited web pages of the web site, outcomes of the access to the web pages (e.g., exposure, conversion, etc.) visitors to these web pages, and visitor devices.

At operation 418, the computer system may determine a context based on an execution of the workflow, the historical behavior data, and the taxonomy and ontology of the relevant web site. In an example, the execution of the workflow may initiate an analysis process (e.g., a ML algorithm) defined by the workflow. The historical behavior data, and the taxonomy and ontology, along with the goal(s) and/or predicate(s) from the intent description may be input to the analysis process. the output may be the context, where this context may be associated with a particular web page of the web site.

To illustrate, consider two examples. In a first example, the specificity level is high and the keyword identification workflow is selected and executed. In this example, the intent description is "I wish to show an ad for my product 'ABC' on detail pages that are for Brand XYZ's athletic shoes and that likely results in conversion." The computer system may determine that the goal is user conversion and identify multiple predicates: "product=ABC," "Brand=XYZ," "product category=athletic shoes." The computer system may then retrieve historical behavior data for only visitors that have visited the details pages of Brand XYZ's athletic shoes and that have made a shoe purchase. This data may identify specific detail pages. Common keywords across these pages and relevant to the brand and/or product category may be identified based on, a statistical analysis (e.g., the top five percent or some other percentage keywords that are common) or by using a ML algorithm. The keywords may be subject to a set of filters such that some of the keywords may be filtered based on a blacklist, a similarity to keywords found on the product ABC's detail page, insufficient traffic associated with them, or have a low relevancy score (where this score may be generated by an artificial intelligence (AI) model as further described in connection with the next figures). The computer system may also generate a relevancy score for each of the remaining keywords and may rank these keywords. These keywords and their ranking may be stored in the data store.

In a second example, the specificity level is low and the attribute identification workflow is selected and executed. In this example, the intent description is "I wish to show an ad for my product 'ABC' to increase my product recognition" The computer system may determine that the goal is product reach and identify the predicate: "product=ABC". The computer system may then determine various values for attributes associated with the predicate (e.g., shoes, athletic shoes, basketball shoes, red shoes, etc.). Optionally, the computer system may present these attribute values at the GUI to allow a selection of a subset of the attribute values by the content provider. Once the set of attribute values are finalized (e.g., based on or absent of a selection of the content provider), the computer system may retrieve historical behavior data for visitors that have visited the website and were exposed to such attributes (e.g., visited any detail page that presented information about shoes, athletic shoes, basketball shoes, and red shoes depending on the attribute set). This data may identify specific details pages. Common contexts (e.g., attributes and their values, where each attribute may correspond to one or more keywords) across these pages may be identified based on a statistical analysis (e.g., the top five percent or some other percentage contexts that are common) or by using a ML algorithm. Some of the contexts may be filtered our based on a set of filters. The computer system may also generate a relevancy score for each of the remaining contexts and may rank these contexts. These contexts and their ranking may be stored in the data store.

At operation 420, the computer system may estimate a performance measurement based on the context determined at operation 418. In an example, the performance measurement may include uncontended and contended performances for using the context. These performances may be determined from the behavior data. For instance, the computer system may identify, from the behavior data, a set of the web pages associated with the context (e.g., the particular web pages that include the keyword, or the particular web pages that include one or more keywords having the attribute) and outcomes of the visitor interactions with these web pages (e.g., converted, exposed, etc.). Based on the intent description's goal(s), the computer system may determine a subset of the set, where the subset corresponds to the particular web pages having an outcome that meets the goal(s). by comparing the size of the subset to the size of the set, the computer system may determine the uncontended performance. By further assuming a particular distribution function given potential contentions with content of other content providers, the computer system may determine the contended performance from the uncontended performance.

At operation 422, the computer system may provide the performance measurement to the content provider device. In an example, the computer system may send the performance measurement to the content provider device with instructions to present the measurement in a performance measurement field of the GUI.

At operation 424, the computer system may estimate a performance measurement for a different web site. In an example, this other web site may not have been selected or identified by the content provider. Instead, the computer system may initiate a recommendation workflow to determine whether to recommend that the content should also be associated with and become presentable at the other web site. The recommendation workflow may repeat operations 414-420, by generating contexts specific to the other web site based on the content provider's intent description and the other web site's ontology and taxonomy. The computer system may then compare the performance measure of this other web site with the first performance measurement of the web site selected or identified by the content provider and/or with a predefined performance threshold. If the first performance measurement or the performance threshold is exceeded, the computer system may generate the recommendation to associate the content with the other web site.

At operation 426, the computer system may provide the recommendation about a different web site to the content provider device. In an example, the computer system may send the recommendation to the content provider device with instructions to present the recommendation in a recommendation field of the GUI. As presented, the recommendation may identify the other web site, indicate that an association therewith is recommendation, and present the related performance measurement.

At operation 428, the computer system may provide the context (as determined at operation 418) to the content provider device. In an example, the computer system may send the context to the content provider device with instructions to present the context in a context field and a selectable option in a context selection field of the GUI. As presented, the GUI may allow the content provider to view and select the context for use in association with its content on the web site.

At operation 430, the computer system determines whether the intent description has changed. In an example, the computer system may have received an updated description of the content provider's intent based on the presentation of the context, the performance measurement, and/or other web site recommendation. If so, operation 412 may follow operation 430, such that the computer system may loop back to the operation for determining an updated context. Otherwise, operation 432 may follow operation 430.

At operation 432, the computer system may receive a selection of the context from the content provider device. In an example, the content provider may select the context via the context selection field of the GUI. The computer system may receive data indicating this selection from the content provider device.

At operation 434, the computer system may generate an association between the context and the content. In an example, the computer system may also receive the content (or an identifier of the content) from the content provider device. Upon receiving the selection of the context, the computer system may generate and store first and second key-value pairs, where the context and the identifier of the content (as stored by the computer system or as available from a remote content source) are the key and value in a first pair, respectively, and the value and the key in a second pair, respectively.

At operation 436, the computer system may store the association in the data store. In an example, the association may be usable to select the content for presentation in a web page of the web site when access to the web page is requested by a visitor device. The selection and insertion of the content is further illustrated in connection with the next figures. Generally, the computer system may receive a context request from the web server. Based on context matching and content selection, the computer system may respond with instructions identifying the content and instructing the web server to insert the content in the web page.

Various operations of the example flow 400 may be repeated based on a trigger event. An example trigger event may be a change to the intent description. Another trigger event may be independent of any change to the intent description or any request from the content provider. Instead, this trigger event may be an elapse of a time interval (e.g., such that the context generation and association with the content can be repeated periodically), or a change to the taxonomy of the web site or to the web pages. For instance, the context may be generated and associated with the content at a first point in time. At a second and subsequent point in time, the intent description may remain the same. However, the applicable workflow may be automatically re-executed at the second point in time based on updated historical behavior data (e.g., including historical data that became available after the first point in time), on a change to the taxonomy of the network resource, an addition of web pages, and/or removal of web pages.

In addition to associating the content with the context (referred to in this paragraph as a first context for clarity), the computer system may further associate the content with a second context based on the second context being an expected context given the first context. In particular, when a visitor device requests access to a web page of the web site, a context associate with this request may be determined. In certain situation, this context may be the first context. In these situations, the second context may be a next context expected to be detected upon a next access request from the visitor device. To illustrate, the first context may be a particular keyword (e.g., "shoes 'LMN'") and is associated with the content (e.g., advertisement for product 'ABC'). Historical behavior data may indicate that upon detecting this keyword, the next context likely to be detected is another keyword (e.g., "shirt OPQ'"). In this case, the second context may be set as the other keyword and may be associated with the same content based on the second content being an expected context of the first context. In other words, the computer system may expand the context-content associations by generating new associations with the content based on expected contexts given the already associated contexts.

To do so, the computer system may analyze the historical behavior data (e.g., based on a prediction model that uses statistical analysis, artificial intelligence, or the like) to identify one or more expected contexts for each context determined under the flow of FIG. 4. For example, a first context and a second context may be identified from historical behavior data. This data may include visitor journeys (e.g., sequences of visited web pages). The second context may be set as an expected context when the visitor journeys indicate that the second context is likely or frequently (e.g., with a likelihood or frequency larger than a predefined threshold) observed as the next context after observing the first context. For instance, if the first context is a keyword found in a first web page and the second context is a keyword found in second and third web pages, the second context may be set an expected context when the visitor journeys indicate that visitors frequently visit the second or third web page after visiting the first web page.

Upon generating a first association of a first context and content, and upon determining a second content that is expected given the first context, the computer system may also generate a second association of the second context with the content. In this way, when the second context detected upon an access request of a visitor device, the computer system may still select the content for insertion even when the first context is not detected.

Figure 5:
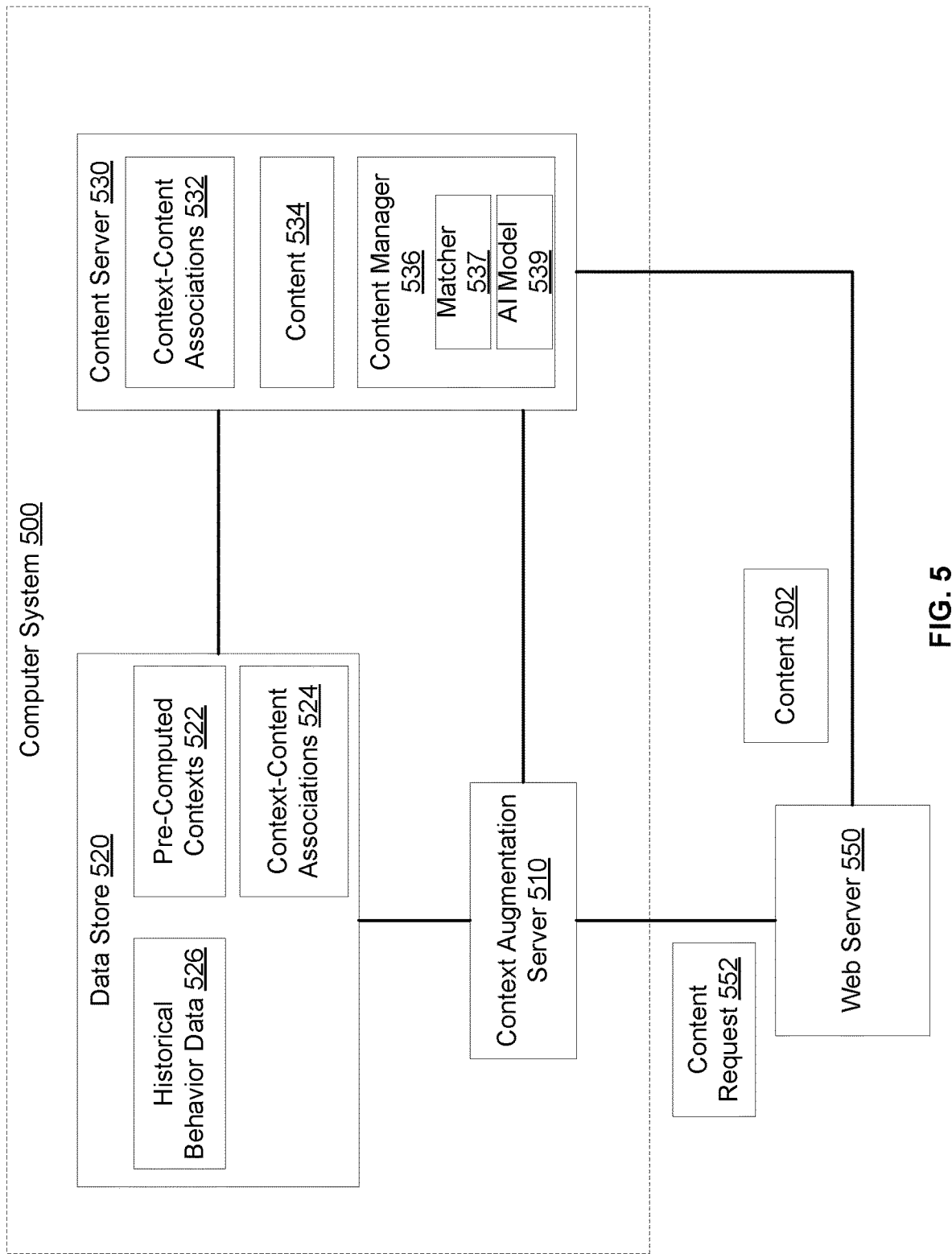
FIG. 5 illustrates an example of a network environment for providing content based on contexts, according to an embodiment of the present disclosure.

FIG. 5 illustrates an example of a network environment for providing content based on contexts, according to an embodiment of the present disclosure. As illustrated, the network environment may include a computer system 500 and a web server 550. The web server 550 may host a web site and may transmit a content request 552 to the computer system, where this content request 552 is associated with a web page of the web site. In response, the computer system 500 may identify content 502 to the web server 550 and may instruct the web server 550 to insert the content 502 in the web page. These interactions between the computer system 500 and the web server 550 may rely on contexts and context-content associations, some of which may have been generated by the computer system 500 as described herein above in connection with FIGS. 3 4. In such cases, the interactions may represent examples of intent satisfaction.

As illustrated, the computer system 500 may include multiple computing resources, such as a context augmentation server 510, a data store 520, and a content server 530. Some or all of these computing resources may be similar to the ones of computer system 200 of FIG. 2. A service provider may manage these computing resources for the intent satisfaction. In an example, the web server 550 may, but need not be, also managed by the service provider. Interactions between the computing resources are further described in the next figure.

The context augmentation server 510 may receive the content request 552 from the web server 550. In response, the context augmentation server 510 may augment the content request 552 by identifying one or more contexts relevant to the content request 552 and adding the context(s) to the content request 552. Some of the identified contexts may be pre-computed (e.g., generated and stored prior to receiving the content request 552). For instance, contexts associated with web pages such as keywords found in the web pages and attributes of the keywords may be pre-computed and already available as pre-computed contexts 522 from the data store 520. Other identified contexts may be computed on-the-fly (e.g., in near real-time upon receiving the content request 552). Contexts associated with a visitor and a visitor device may be computed on-the-fly based on an identifier of the visitor, an identifier of the visitor device, a location of the visitor device, the timing of the content request 552, and/or profile information about the visitor and/or visitor device.

In an example, the pre-computed contexts 522 may represent contexts derived by the service provider by executing the various workflows using different intent descriptions. For instance, each time an intent description of a content provider is received and the resulting context-content associations are identified, the service provider may also store the identified contexts as pre-computed contexts. Similarly, the content provider may input its own intent descriptions, generate context-content associations (without necessarily storing these), and store the identified contexts as also pre-computed contexts.

The augmented content request may be sent to the content server 530. In response, the content server 530 may select and identify the content 502 to the web server 550. To do so, the content server 530 may store context-content associations 532 in its cache. These context-content associations 532 may be retrieved periodically from context-content associations 524 that are already stored in the data store 520. The context-content associations 524 of the data store 520 may have been generated based on intent descriptions of content providers as illustrated herein above in connection with FIGS. 3-4. The retrieval may include a periodic pull or a push upon an addition of new context-content associations. By caching the context-content associations 532, the content server 530 may more quickly identify the content 502. Nonetheless, if no match is detected from the cache, the content server 530 may asynchronously query the data store 520 (or a query engine thereof) for candidate matches from the context-content associations 524.

The web server 550 may also store the different content 534 of the different content providers. This storing may include storing the actual content or identifiers of the actual content (e.g., URLs of the network locations where the content 534 may be stored).

The content server 530 may also host a content manager 536 to select the content 502 from the content 534 based on the context-content associations 532 (or the context-content associations 524 if there was no match in the cache). In an example, the content manager 536 may include a matcher 537 and an AI model 539.

The matcher 537 may be configured to match the context(s) from the augmented content request with context(s) from the context-content associations 532 (or the context-content associations 524 if there was no match in the cache). The matching may be a Boolean matching. For instance, one particular content may be associated with a set of pre-computed contexts including a first pre-computed context and a second pre-computed context. In comparison, the augmented content request may include a set of added contexts including a first context and a second context. If the added contexts match the pre-computed contexts (e.g., the first context matches the first pre-computed context, and the second context matches the second pre-computed context), the matcher 537 may identify a match between the content request 552 and the particular content and this content may become candidate content for selection and insertion. However, if a mismatch exists (e.g., either the first context or the second context does not match the first pre-computed context or the second pre-computed context, respectively), the matcher 537 may identify a mismatch between the content request 552 and the particular content and the particular content may not be added (or may be removed) from the set of candidate content.

The AI model 539 may be configured to generate a relevancy score for content of a content provider based on historical behavior data, the applicable intent description of the content provider, the matched pre-computed contexts, and the content. For example, the AI model 539 may implement a ML algorithm. This algorithm may be trained with historical behavior data 526 stored at the data store. The historical behavior data 526 may include historical intent descriptions, contexts, content, and outcomes of presenting the content given the intent descriptions and contexts. The outcomes may be used as ground truth to train the ML algorithm to generate relevancy scores. The training may minimize a loss of the ML algorithm by tuning parameters of the ML algorithm to best approximate the relevancy scores based on inputs that include the historical intent descriptions, contexts, and content and knowing the historical outcomes (e.g., the loss function is reduced when the ML algorithm outputs a high relevancy score for an input that includes an intent description having a conversion goal and the outcome indicates a conversion; otherwise, the loss function is increased). In this way, the ML algorithm may learn or be trained to recognize features inherent to intent descriptions, contexts, and content.

Once trained, the AI model 539 may receive, for each candidate content of a content provider, the pre-computed contexts that were matched, the corresponding intent description of the content provider, and the candidate content. This information may be provided as an input the AI model 539 or a feature map may be generated from the information and provided as the input. In response, the AI model 539 may output a relevancy score the candidate content. Accordingly, the different candidate content may be ranked and the content server 530 may select the content 502 from the candidate content based on the relevancy scores and other factors (e.g., including placement rate, visitor fatigue, and the like).

Figure 6:
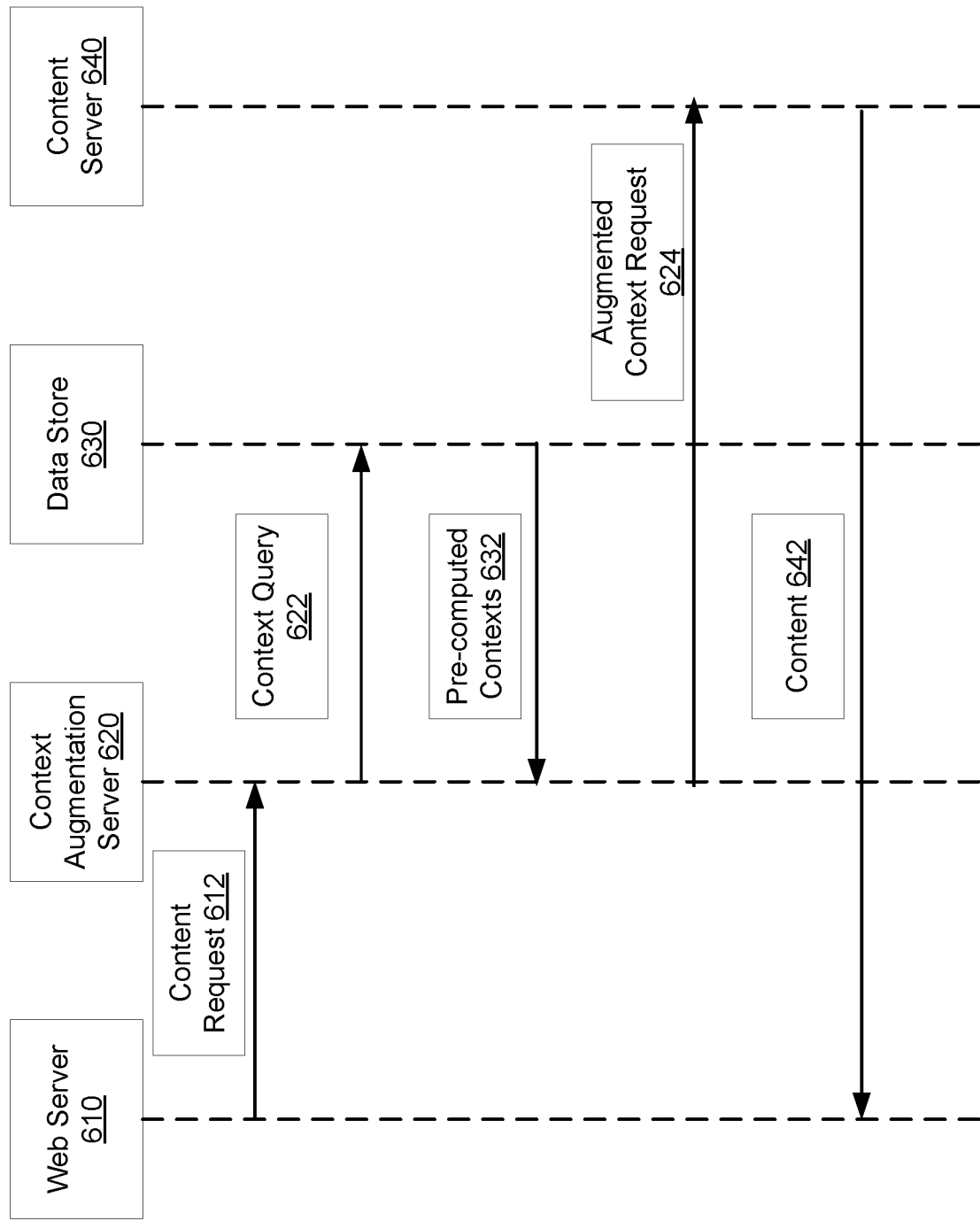
FIG. 6 illustrates an example of interactions between computing resources for providing content based on contexts, according to an embodiment of the present disclosure.

FIG. 6 illustrates an example of calls between computing resources for providing content based on contexts, according to an embodiment of the present disclosure. In an example, the interactions may include calls, such as API calls to exchange data, execute processes, and generate contexts. Some or all of the computing resources may be managed by a service provider and may be the same as those described herein above in connection with FIG. 5. In particular, the computing resources may include a context augmentation server 620, a data store 630, and a content server 640.

As illustrated, a web server 610 may send a content request 612 to the context augmentation server 620 based on a visitor device's access request to a web page. The content request 612 may identify the web page and may include a pre-computed context associated with the web page (e.g., a keyword).

In response, the context augmentation server 620 may identify additional contexts to add to the content request 612. Some of the additional contexts, such as ones associated with the web page, may be pre-computed, while other additional contexts, such as about the visitor or the visitor device (e.g., device location, timing, etc.) may be computed on-the-fly. To identify the pre-computed contexts, the context augmentation server 620 may generate and transmit a context query 622 to the data store 630. The context query 622 may identify the web page and any context already included in the content request 612.

A query engine of the data store 630 may return pre-computed contexts 632 to the content augmentation server 620. In an example, the query engine may identify the various pre-computed contexts 632 that are already associated with the web page. For instance, the data store 630 may store various pre-computed contexts and associations of these contexts with web pages. In this example, the query engine may look up the stored pre-computed contexts 632 using the identifier of the web page from the context query 622 to then return the set of pre-computed contexts 632 associated with the web page. In another example, the query engine may identify the various pre-computed contexts that are already associated with the context(s) included in the context query 622. In particular, and similarly to storing associations of pre-computed contexts with web pages, the data store 630 may store associations between the pre-computed contexts themselves. Hence, the query engine may look up these pre-computed contexts 632 associations using the contexts(s) from the context query 622 to then return the set of associated pre-computed contexts 632. In yet another example, the query engine may identify a first pre-computed context associated with the web page or the context from the content request 622 as described in the two previous examples. The query engine may also identify a second pre-computed context as an expected content given the first pre-computed context. For instance, the query engine may input the first pre-computed context to a prediction engine that then output the second pre-computed context as described herein above. The second pre-computed context may be returned to the context augmentation server 620. Hence, the pre-computed contexts 632 may include a pre-computed context(s) determined based on the identifier of the web page, a pre-computed context(s) identified based on any context from the context request 612, and/or a pre-computed context(s) identified based as an expected context given another identified context.

The context augmentation server 620 may update the content request 612 to include the pre-computed contexts 632, thereby generating an augmented context request 624. The augmented context request 624 may be transmitted to the content server 640.

The content server 640 may select content 642 based on the augmented context request 624. In an example, the selection may include context matching to identify a set of candidate content and content scoring to select the content 642 from the set. For the content matching, the content server 640 may match the pre-computed contexts 632 included in the augmented context request 624 with contexts from context-content associations available from the data store. Particular content is added to the set of candidate content (or removed from the set) based on a match between the pre-computed contexts from the augmented context request 624 and the contexts from the context-content associations of the particular content. For the content scoring, a relevancy score may be generated for each of the candidate content in the set. The relevancy score for particular content of a content provider may be generated by an AI model based on an input thereto. The input may include the matched pre-computed contexts, the relevant intent description of the content provider, and/or the particular content. The relevancy score may be used as one of the factors for the selection of the content 624 from the set. The content server 640 may send the content 642 to the web server for insertion in the web page.

Figure 7:
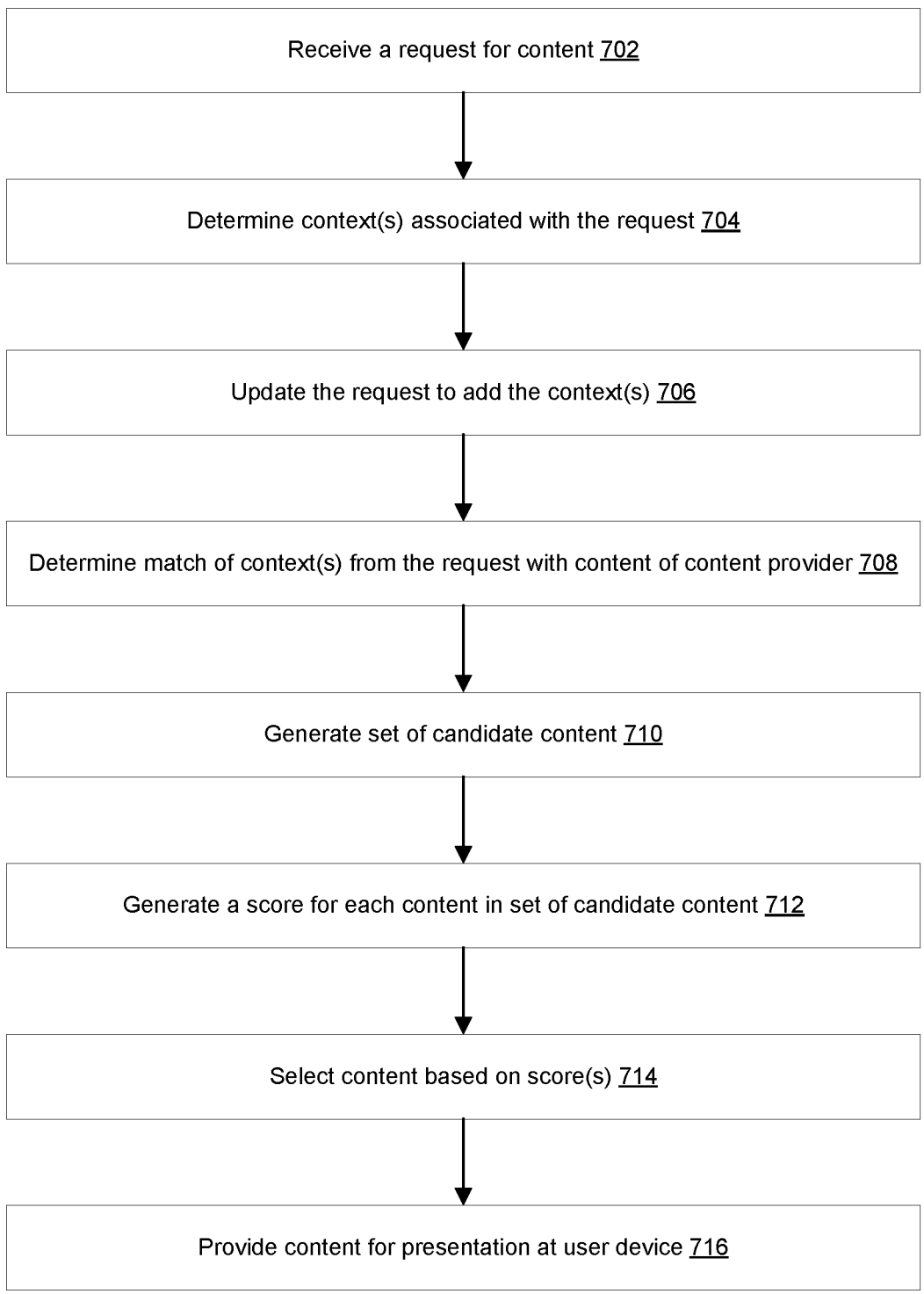
FIG. 7 illustrates an example flow for providing content based on contexts, according to an embodiment of the present disclosure.

FIG. 7 illustrates an example flow for providing content based on contexts, according to an embodiment of the present disclosure. Instructions for performing the operations of the flow can be stored as computer-readable instructions on a non-transitory computer-readable medium of a computer system, such as the computer systems described herein above in connection with FIGS. 1-2 and 5. As stored, the instructions represent programmable modules that include code or data executable by a processor(s) of the computer system. The execution of such instructions configures the computer system to perform the specific operations shown in the figures and described herein. Each programmable module in combination with the processor(s) represents a means for performing a respective operation(s). While the operations are illustrated in a particular order, it should be understood that no particular order is necessary and that one or more operations may be omitted, skipped, and/or reordered.

As illustrated, the example flow may start at operation 702, where the computer system may receive a request for content. In an example, a web server may send the content request to the computer system based on an access request of a visitor device to a web page. The content request may identify the web page and, include one or more contexts.

At operation 704, the computer system may determine contexts associated with the request. In an example, different context types may be identified. For instance, a first context may be associated with the web page, a second context may be associated with a context from the content request, and a third context may be associated with context identified based on the web page or the context from the content request. Such contexts may be pre-computed and identifying them may rely on stored associations between web pages and pre-computed contexts or between pre-computed contexts themselves. Other context types may be also identified, such as a context associated with a visitor that is operating the visitor device and/or with the visitor device.

At operation 706, the computer system may update the content request to add the context(s) determined at operation 704. In an example, the computer system may generate an augmented content request by adding the determined context(s).

At operation 708, the computer system may determine a match between the context(s) from the updated content request (e.g., the augmented content request) and content of a content provider. In an example, the particular content may be pre-associated with contexts and these associations may be stored as context-content associations. The computer system may determine a match between all of the context(s) from the updated content request and contexts from the context-content associations of the particular content. Based on the match, the particular content may be identified as candidate content. If a mismatch exist, the particular content may not be candidate content.

At operation 710, the computer system may generate a set of candidate content. For example, the computer system may match the pre-computed contexts from the updated content request with multiple content, under operation 708. Each time a match is determined, the corresponding content may be added to the set of candidate content.

At operation 712, the computer system may generate a score for each candidate content in the set of candidate content. In an example, each candidate content corresponds to an intent description of a content provider. That intent description, along other information (e.g., the matched pre-computed contexts and/or the particular candidate content itself) may be input to an AI model hosted by the computer system. The AI model may be trained to generate the relevancy score based on historical behavior data, intent descriptions, contexts, and content.

At operation 714, the computer system may select content from the set of candidate content based on the score of this content and relevancy scores of other candidate content, among other factors. In an example, the computer system may rank the candidate content from the set based on their scores and may use this ranking along with, for instance, placement rate and visitor fatigue, to select the content.

At operation 716, the computer system may provide the content for presentation at the user device. In an example, the computer system may send, to the web server in response to the content request, an identifier of the content (e.g., a URL of a content source storing the content) along with instructions to insert the content in the web page. Accordingly, when the web page is presented at the visitor device, the presented web page may include the content.

Figure 8:
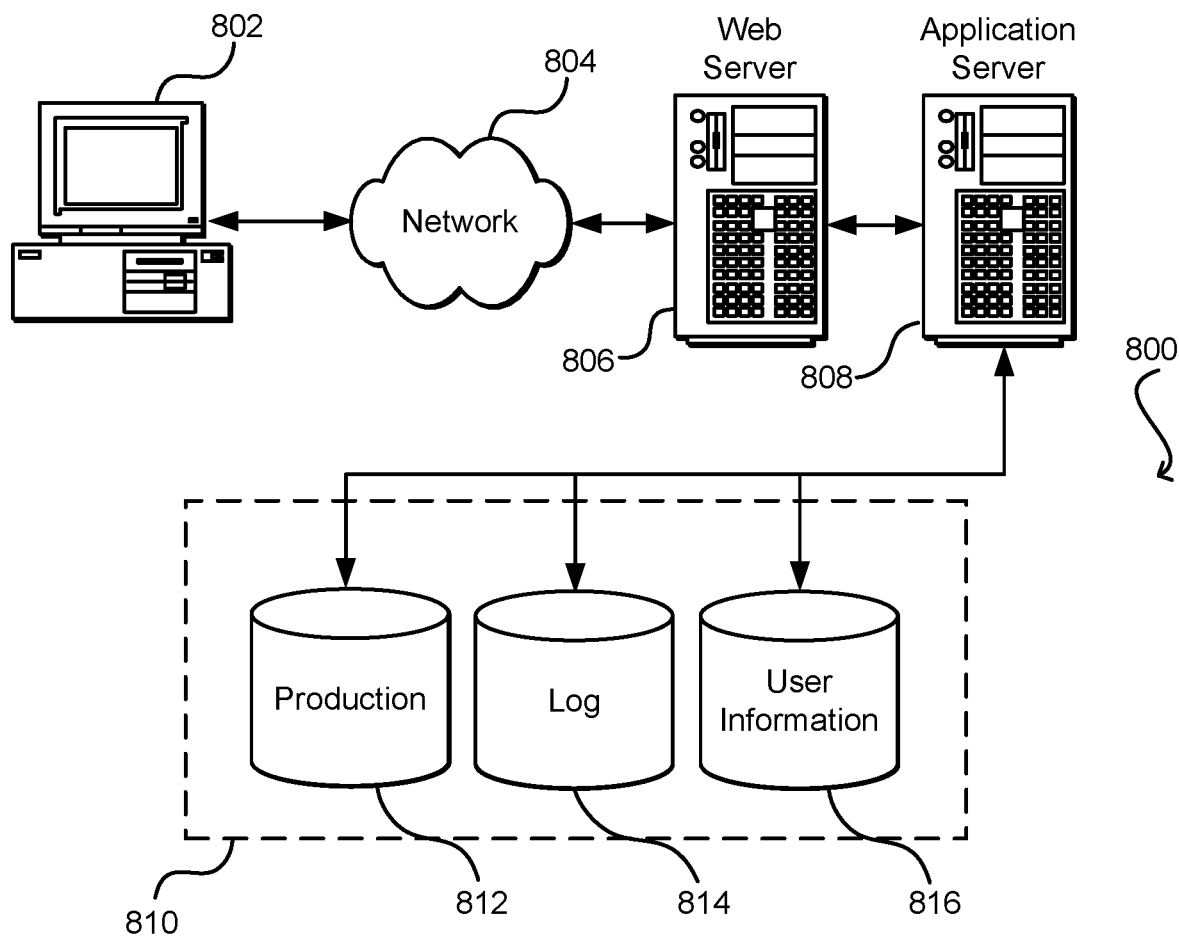
FIG. 8 illustrates a computer architecture diagram showing an example computer architecture, according to an embodiment of the present disclosure.

FIG. 8 illustrates a computer architecture diagram showing an example computer architecture, according to an embodiment of the present disclosure. This architecture may be used to implement some or all of the systems described herein. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a random access memory ("RAM") 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 820. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800. The mass storage device 818 might also store other programs and data not specifically identified herein.

In one embodiment, the mass storage device 818 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8. It should also be appreciated that many computers, such as the computer 800, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method implemented on a computer system, comprising:
providing a graphical user interface to a computing device of a content provider, the graphical user interface comprising an input field configured to receive natural language input;
receiving, from the computing device, an intent description based at least in part on the input field of the graphical user interface, the intent description associated with a presentation of content of the content provider at a web site;
determining a goal and a predicate for a query data structure based at least in part on natural language processing of the intent description;
sending a query to a data store storing a plurality of workflows, the query having the query data structure and comprising the goal and the predicate;
receiving, from the data store and based at least in part on the query, an identifier of a workflow from the plurality of workflows, the workflow comprising executable instructions associated with determining a context of a web page of the web site based at least in part on historical behavior data of web visitors to the web site and on a taxonomy of the web site;
determining the context of the web page based at least in part on an execution of the workflow, the historical behavior data, and the taxonomy of the web site, the context specific to the web page and comprising a plurality of keywords and an attribute of the plurality of keywords;
storing, in the data store, an association between the context and the content; and
instructing a web server to insert the content in the web page based at least in part on a detection of the context and on the association in the data store.

2. The method of claim 1, further comprising:
sending, to the graphical user interface, the context and an option to select the context from a plurality of contexts; and
generating the association based at least in part on a selection of the option at the graphical user interface.

3. The method of claim 1, further comprising:
determining, based at least in part on the intent description, candidate web pages of the web site;
identifying candidate keywords from the candidate web pages, the keywords corresponding to items described in the candidate web pages; and
computing a similarity measurement between the candidate keywords, wherein the workflow comprises a keyword identification workflow that is selected based at least in part on the similarity measurement indicating a dissimilarity between attributes of the candidate keywords, and wherein the context comprises a keyword based at least in part on an execution of the keyword identification workflow.

4. The method of claim 1, further comprising:
determining, based at least in part on the intent description, candidate web pages of the web site;
identifying candidate keywords from the candidate web pages, the keywords corresponding to items described in the candidate web pages; and
computing a similarity measurement between the candidate keywords, wherein the workflow comprises an attribute identification workflow that is selected based at least in part on the similarity measurement indicating a similarity between attributes of the candidate keywords, and wherein the context comprises the attribute of the plurality of keywords based at least in part on an execution of the attribute identification workflow.

5. A computer system, comprising:
a processor; and
a memory storing computer-readable instructions that, upon execution by the processor, configure the computer system to:
receive, from a computing device of a content provider, an intent description associated with providing content at a network resource that comprises a plurality of network documents;
determine a goal and a predicate for a query data structure based at least in part on natural language processing of the intent description;
send a query to a data store storing a plurality of workflows, the query having the query data structure and comprising the goal and the predicate;
receive, from the data store and based at least in part on the query, an identifier of a workflow from the plurality of workflows, the workflow comprising executable instructions associated with determining a context of a network document based at least in part on historical behavior data of visitors to the network resource and on a taxonomy of the network resource;
determine the context based at least in part on an execution of the workflow, the historical behavior data, and the taxonomy, the context specific to the network document and comprising a plurality of keywords and an attribute of the plurality of keywords; and
store an association between the context and the content, the association being usable to select the content for presentation in the network document.

6. The computer system of claim 5, wherein the computer-readable instructions further configure the computer system to:
provide a graphical user interface to the computing device of the content provider, wherein the graphical user interface comprises an input field configured to receive natural language input, wherein the intent description is received based at least in part on the input field, wherein the network resource comprises a web site, wherein the network document comprises a web page of the web site, wherein the association is stored in the data store; and
instruct a web server to insert the content in the web page based at least in part on a detection of the context and on the association in the data store.

7. The computer system of claim 5, wherein the goal is determined based at least in part on a query understanding of the intent description, and wherein the predicate is determined based at least in part on the query understanding and the taxonomy of the network resource.

8. The computer system of claim 5, wherein the intent description is received based at least in part on input from the computing device, wherein the input identifies the network resource, and wherein the computer-readable instructions further configure the computer system to:
determine a second context of a second network document from a second network resource, the second context determined based at least in part on the workflow, second historical behavior data of second visitors to the second network resource, and a second taxonomy of the second network resource;

determine, based at least in part on the second context and the second historical behavior data, a performance measurement associated with presenting the content at the second network document; and provide, to the computing device, a recommendation to associate the content with the second network resource.

9. The computer system of claim 5, wherein the computer system is associated with a service provider, and wherein the computer-readable instructions further configure the computer system to provide an interface to a computing device of the service provider, wherein the interface comprises workflow fields, and wherein the workflow is generated and stored in the data store based at least in part on input of the service provider at the workflow fields of the interface.

10. The computer system of claim 5, wherein the association is stored in a data store as a key-value pair, wherein a key of the key-value pair comprises the context, and wherein a value of the key-value pair comprises an identifier of the content.

11. The computer system of claim 10, wherein the computer-readable instructions further configure the computer system to:

store the key-value pair in cache, and wherein the content is inserted in the network document based at least in part on a detection of the context and on the key-value pair in the cache.

12. The computer system of claim 11, wherein the computer-readable instructions further configure the computer system to:

generate a second key-value pair based at least in part on the association between the context and the content, wherein a key of the second key-value pair comprises the identifier of the content, and wherein a value of the second key-value pair comprises the context; and in response to a query from the computing device of the content provider about the content, provide the context to the computing device based at least in part on the second key-value pair.

13. A computer-readable storage medium comprising instructions that, upon execution on a computer system, configure the computer system to perform operations comprising:

receiving, from a computing device of a content provider, an intent description associated with providing content at a network resource that comprises a plurality of network documents;

determining a goal and a predicate for a query data structure based at least in part on natural language processing of the intent description;

sending a query to a data store storing a plurality of workflows, the query having the query data structure and comprising the goal and the predicate;

receiving, from the data store and based at least in part on the query, an identifier of a workflow from the plurality of workflows, the workflow comprising executable instructions associated with determining a context of a network document based at least in part on historical behavior data of visitors to the network resource and on a taxonomy of the network resource;

determining the context based at least in part on an execution of the workflow, the historical behavior data, and the taxonomy the context specific to the network document and comprising a plurality of keywords and an attribute of the plurality of keywords; and storing an association between the context and the content, the association being usable to select the content for presentation in the network document.

14. The computer-readable storage medium of claim 13, wherein the intent description is received from an interface presented at the computing device of the content provider, and wherein the operations further comprise:

determining, based at least in part on the context and the historical behavior data, a performance measurement associated with presenting the content at the network document; and providing the performance measurement to the computing device, wherein the performance measurement is presented at the interface in association with the intent description.

15. The computer-readable storage medium of claim 14, wherein the operations further comprise:

receiving, based at least in part on a presentation of the performance measurement at the interface, an updated intent description from the computing device of the content provider;

selecting a second workflow from the plurality of workflows based at least in part on the updated intent description; and determining a second context of the network document based at least in part on an execution of the second workflow, the historical behavior data, and the taxonomy.

16. The computer-readable storage medium of claim 14, wherein the interface comprises a performance field that presents the performance measurement, a plurality of context fields that present a plurality of determined contexts, and option fields available to select one or more of the plurality of determined contexts, and wherein the operations further comprise:

receiving, from the computing device of the content provider, a selection of a subset of contexts from the plurality of determined contexts based at least in part on the option fields;

determining, based at least in part on the subset, an updated performance measurement; and providing the updated performance measurement to the computing device, wherein the updated performance measurement is presented in the performance field of the interface.

17. The computer-readable storage medium of claim 13, wherein the operations further comprise:

determining, based at least in part on the context and the historical behavior data, a second context of a second network document, wherein detection of the second context is expected based at least in part on a visitor accessing the network document; and storing a second association between the second context and second content of a second content provider.

18. The computer-readable storage medium of claim 13, wherein the intent description is received based at least in part on input from the computing device at an interface, wherein the interface identifies a plurality of network resource, and wherein the input selects the network resource from the plurality of network resources.

19. The computer-readable storage medium of claim 13, wherein the workflow is executed at a first point in time to determine the context, and wherein the operations further comprise:

determining a second context based at least in part on a re-execution of the workflow at a second point in time, wherein the workflow is automatically re-executed at the second point based at least in part on updated historical behavior data and while the intent description remains the same.

20. The computer-readable storage medium of claim 13, wherein the operations further comprise:

determining a second context by at least re-executing the workflow based at least in part on a change to the taxonomy of the network resource.

* * * * *